United States Patent [19]
Hall

[11] Patent Number: 5,890,001
[45] Date of Patent: Mar. 30, 1999

[54] ARBITRATION APPARATUS EMPLOYING TOKEN RING FOR ARBITRATING BETWEEN ACTIVE JOBS

[75] Inventor: Trevor Hall, Glossop, England

[73] Assignee: International Computers Limited, London, United Kingdom

[21] Appl. No.: 735,790

[22] Filed: Oct. 21, 1996

[30] Foreign Application Priority Data

Jan. 9, 1996 [GB] United Kingdom .................... 9600336

[51] Int. Cl.⁶ ....................................... G06F 13/14
[52] U.S. Cl. .................... 395/728; 395/729; 395/730; 395/731; 395/672; 395/674; 370/450; 370/447; 370/452; 370/448; 370/455; 370/431
[58] Field of Search ..................... 395/670–675, 395/200.03, 200.25, 200.81, 294, 728–731, 800, 561, 566, 683; 370/85.4, 909, 431–455

[56] References Cited

U.S. PATENT DOCUMENTS

| | | | |
|---|---|---|---|
| 3,593,300 | 7/1971 | Driscoll et al. | 395/674 |
| 4,378,590 | 3/1983 | Kim | 395/674 |
| 4,953,082 | 8/1990 | Nomura et al. | 395/800.25 |
| 5,274,637 | 12/1993 | Sakamura et al. | 370/455 |
| 5,325,526 | 6/1994 | Cameron et al. | 395/672 |
| 5,388,223 | 2/1995 | Guthrie et al. | 370/448 |
| 5,410,722 | 4/1995 | Cornaby | 395/674 |
| 5,410,733 | 4/1995 | Cornaby | 395/672 |
| 5,528,594 | 6/1996 | Butter et al. | 370/85.5 |
| 5,566,177 | 10/1996 | Bhandari et al. | 395/85.06 |

*Primary Examiner*—Meng-Ai T. An
*Assistant Examiner*—Nabil El-Hady
*Attorney, Agent, or Firm*—Lee, Mann Smith McWilliams, Sweeny & Ohlson

[57] ABSTRACT

Arbitration apparatus is described for arbitrating between a number of jobs, for example for distributing message traffic over a data transmission network. The arbitration apparatus comprises an activity register containing a number of activity bits indicating which of a number of transmission jobs is currently active. The apparatus also includes a two-tier token ring arrangement comprising an outer ring and a number of inner rings. Each ring consists of a number of registers, holding a token which is passed cyclically around the ring. Each register has a bypass path which bypasses the register if a corresponding job or group of jobs is inactive. The positions of the tokens in the rings determines which job is to be scheduled next. Each ring also includes a keeper register for preserving the token if all the jobs are inactive.

8 Claims, 6 Drawing Sheets

ARBITRATION APPARATUS EMPLOYING TOKEN RING FOR ARBITRATING BETWEEN ACTIVE JOBS

BACKGROUND TO THE INVENTION

This invention relates to arbitration apparatus. The invention is particularly, although not exclusively, concerned with an arbitration apparatus for distributing message traffic over a data transmission network.

By "arbitration" is meant a process of deciding which of a number of currently active jobs is to be scheduled next, in such a way as to achieve a proper balance between the different jobs. For example, in a data transmission network, a job may consist of sending a datagram or message from a particular source to a particular destination, and in this case arbitration may be required to distribute message traffic evenly between the different possible destinations, so as to ensure that particular parts of the network do not become overloaded.

One way of performing arbitration is to maintain a list of possible jobs, and to scan this list cyclically, looking for currently active jobs. However, a problem with this is that, if the overall number of jobs is relatively large, and the number of active jobs is small, the arbitration mechanism may spend an excessive amount of time scanning through non-active entries in the list. In the case of a data transmission network, for example, this may lead to an unacceptable reduction in transmission rate.

Alternatively, arbitration may be performed by a decision logic circuit, which examines all the entries in the job list in parallel, so as to select the next active job. However, such logic circuits are practical only where the number of entries in the job list is relatively small, and do not easily scale up to larger lists. For example, if the job list contains 64 entries (corresponding for example to 64 possible destinations in a network), the fan-in to the decision logic becomes unmanageable.

The object of the present invention is to provide an arbitration circuit capable of rapid operation, and capable of efficiently handling relatively large, variable sized job lists.

SUMMARY OF THE INVENTION

According to the invention there is provided arbitration apparatus for arbitrating between a plurality of jobs, said apparatus comprising:

(a) an activity register containing a plurality of activity bits indicating which of said jobs is active;

(b) at least one token ring comprising a plurality of registers connected in a ring, each of the registers corresponding to one of the jobs;

(c) means for passing a token around said ring through said registers and for selecting one of the jobs in accordance with the current position of said token; and (d) bypass paths, controlled by the activity bits, for bypassing any of the registers that correspond to inactive jobs.

It can be seen that, because token registers corresponding to inactive jobs are bypassed, the arbiter does not waste time examining registers corresponding to inactive jobs, and hence the arbitration can be very rapid.

Preferably, the ring includes a keeper register for preserving the token when all jobs are inactive.

A preferred form of the invention uses a two-tier token ring arrangement.

DESCRIPTION OF AN EMBODIMENT OF THE INVENTION

One embodiment of the invention will now be described by way of example with reference to the accompanying drawings.

System Level Description

Figure 1:
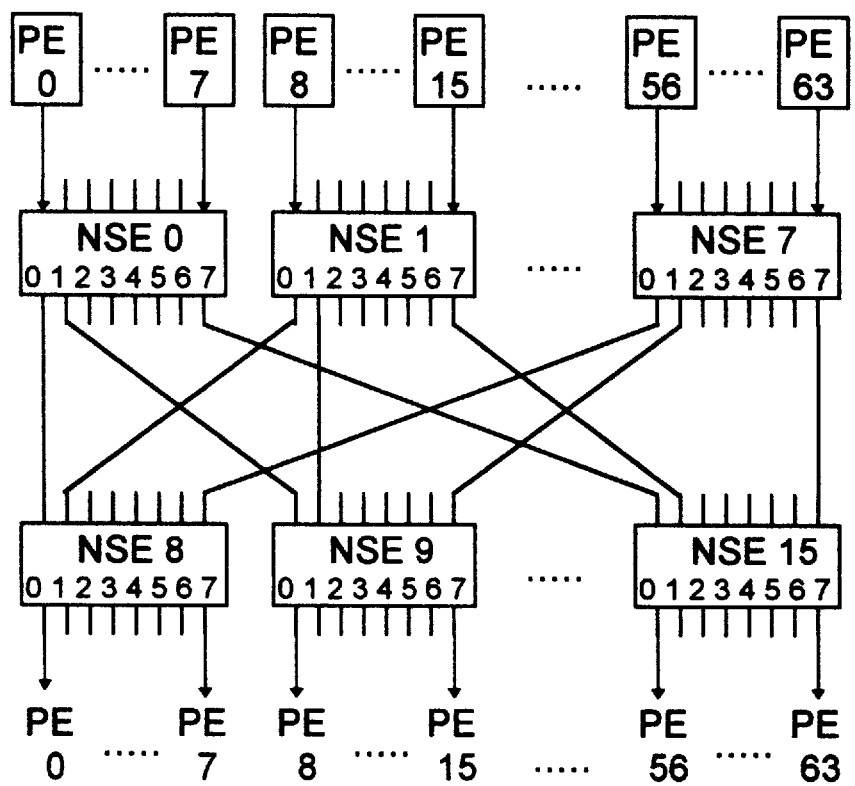
FIG. 1 is a block diagram of a computer system embodying the invention.

FIG. 1 shows a data processing system comprising 64 processing elements (PE0–PE63). The PEs are interconnected by a network, which allows datagrams to be routed from any PE to any other PE, or to itself. Each datagram consists of a sequence of 128-byte frames, each frame having a header.

In this example, the network is a 2-level delta network, comprising sixteen network switching elements (NSEs): eight first level NSEs (NSE0–NSE7) and eight second level NSEs (NSE8–NSE15). Each NSE comprises an 8×8 crossbar switch, having eight input ports and eight output ports. Each NSE can connect any of its input ports to any of its output ports. Up to eight separate connections can coexist in an NSE, each input connected to a different output, without any blocking. The input ports of the first-level NSEs receive input data from the respective PEs, and the output ports of the second-level NSEs return output data to the respective PEs. The NSEs are connected in a shuffle-exchange network as shown, with the eight output ports of each first-level NSE respectively connected to the input ports of the eight second-level NSEs.

Each frame sent through the delta network includes a destination port address byte in the frame header. Bits 3–5 of this byte control the routing through the first level NSEs, and bits 0–2 control the routing through the second level NSEs.

Each NSE has four input buffers at each of its input ports, each capable of holding a frame. If the four buffers at any NSE input port become full, blocking will occur within the network. To avoid this, each of the PEs includes an arbiter unit for selecting the next destination to which a frame is to be sent by that PE. As will be described, each arbiter unit attempts to distribute the message traffic from the PE evenly, by sending a small number of frames to one destination, followed by a small number of frames to a different destination, and so on. In particular, the arbiter unit limits the number of consecutive frames sent to PEs attached to the same second-level NSE, so as to avoid overloading the input buffers in that NSE.

Arbiter Unit

Figure 2:
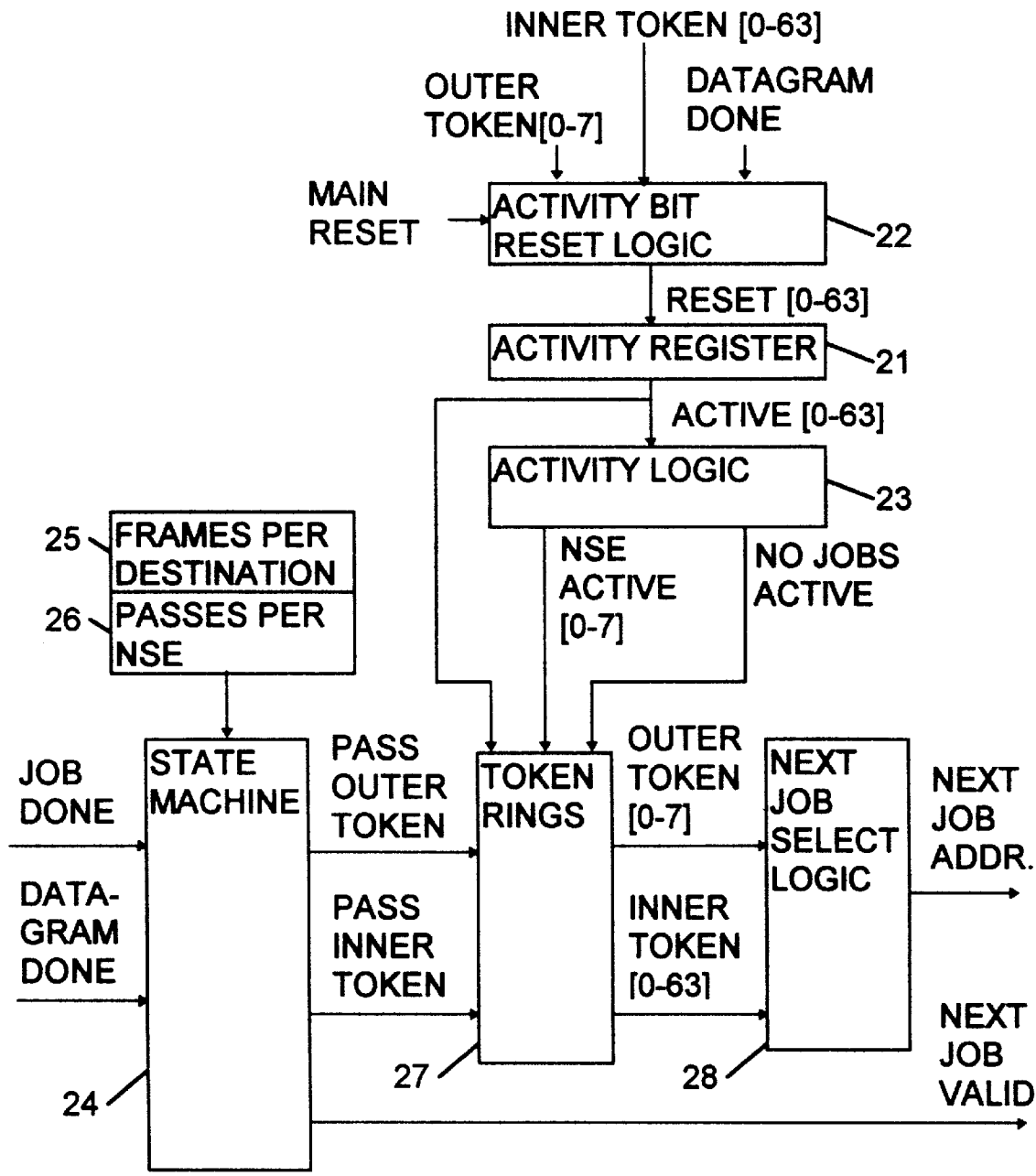
FIG. 2 is a block diagram showing an arbiter unit used in the system.

FIG. 2 shows the arbiter unit in one of the PEs.

The arbiter unit includes an activity register 21, holding 64 activity bits ACTIVE[0–63], one for each of the 64 PEs. Whenever a source PE wishes to initiate the sending of a datagram to a particular destination PE, it sets the activity bit corresponding to that destination PE. When the transmission of a datagram is complete, the activity bit corresponding to the destination PE is reset. Thus, the state of each activity bit indicates whether or not a job (i.e. transmission of a datagram to a particular destination PE) is currently active.

An activity bit reset circuit 22 produces a 64-bit signal RESET[0–63], for resetting the individual bits of the activity register.

An activity logic circuit 23 receives the ACTIVE[0–63] signal and generates signals NSE_ACTIVE[0–7] and NO_JOBS_ACTIVE. Each of the bits of NSE_ACTIVE [0–7] is the OR function of a group of eight adjacent activity bits; for example, NSE_ACTIVE[0] is the OR of ACTIVE [0–7]. Thus, each bit of NSE_ACTIVE[0–7] corresponds to a respective one of the eight second-level NSEs (NSE8–NSE15), and indicates whether any of the PEs attached to that NSE is currently active as a destination. The signal NO_JOBS_ACTIVE is the OR function of the inverses of the signals NSE_ACTIVE[0–7], and indicates that none of the PEs is currently active as a destination.

The arbiter unit is controlled by a state machine 24. The state machine receives signals JOB_DONE and DATAGRAM_DONE from the transmission circuits in the local PE. JOB_DONE indicates that a frame has been transmitted by the local PE, and DATAGRAM_DONE indicates that the end of a datagram has been reached. The state machine also receives two parameters FRAMES_PER_DESTINATION and PASSES_PER_NSE, which are held in registers 25,26. FRAMES_PER_DESTINATION indicates the maximum number of frames to be sent to the currently selected destination PE before moving on to the next destination PE. PASSES_PER_NSE indicates the maximum number of inner token passes (see below) before moving on to the next second-level NSE. The state machine produces output signals PASS_OUTER_TOKEN, PASS_INNER_TOKEN, and NEXT_JOB_VALID.

The arbiter also includes a set of token rings 27, which produce token signals OUTER_TOKEN[0–7] and INNER_TOKEN[0–63]. In normal operation, one of the bits of OUTER_TOKEN[0–7] is true, representing an outer token. The position of the outer token indicates which of the second-level NSEs is currently selected. INNER_TOKEN [0–63] consists of eight groups of eight bits, each group corresponding to one of the second level NSEs. In normal operation, one bit within each of these groups is true, representing an inner token. The position of the inner token within the group corresponding to the currently selected NSE indicates which of the PEs attached to that NSE is currently selected as a destination.

The token signals are fed to a next job selection logic circuit 28, which generates a NEXT_JOB_ADDRESS signal. This signal is returned to the transmission circuits within the local PE, and represents the address of the currently selected destination PE.

Activity Bit Reset Logic

Figure 3:
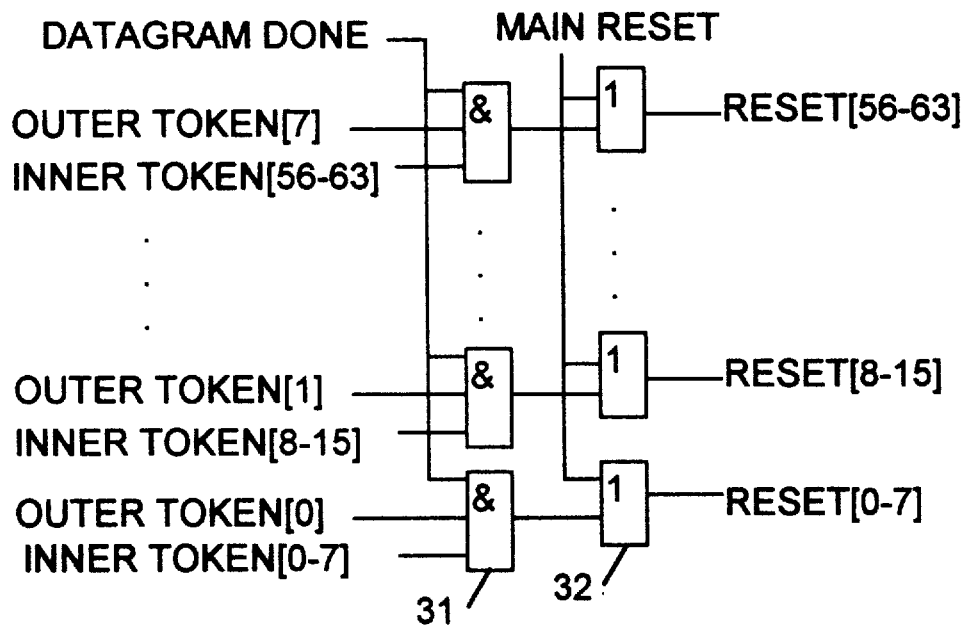
FIG. 3 is a block diagram of an activity bit reset circuit forming part of the arbiter unit.

FIG. 3 shows the activity bit reset logic 22 in more detail. The logic 22 comprises eight AND gates 31 and eight OR gates 32.

Each of the AND gates 31 has three inputs. The first inputs receive DATAGRAM_DONE, the second inputs receive OUTER_TOKEN[0–7], and the third inputs receive INNER_TOKEN[0–63], as shown.

Each of the OR gates 32 has two inputs. The first inputs receive a MAIN_RESET signal, and the second inputs receive the outputs of the AND gates 31. The outputs of the OR gates provide the signals RESET[0–63].

It can be seen that if MAIN_RESET goes true, all the RESET[0–63] bits will be true, and so all the bits of the activity register 20 will be reset.

If DATAGRAM_DONE goes true, indicating the end of transmission of a datagram, the bit of RESET[0–63] that corresponds to the currently selected destination PE will be true. Hence, the bit of the activity register 20 that corresponds to the selected PE will be reset, to indicate that the associated job is no longer active.

Next Job Selection Logic

Figure 4:
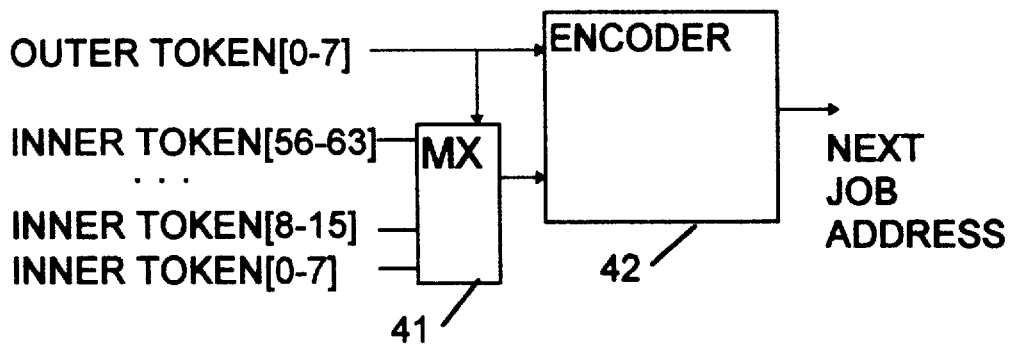
FIG. 4 is a block diagram of a next job selection circuit forming part of the arbiter unit.

FIG. 4 shows the next job selection logic 27 in more detail. The logic consists of an 8-way multiplexer 41 and an encoder 42.

The multiplexer 41 receives successive groups of eight bits of INNER_TOKEN[0–63] at its eight inputs. The multiplexer is controlled by OUTER_TOKEN[0–7], and selects the one of its eight inputs corresponding to the current position of the outer token. OUTER_TOKEN[0–7] and the output of the multiplexer are encoded together in the encoder 42 to produce an address signal NEXT_JOB_ADDRESS, which identifies the destination PE pointed to by the tokens.

Token Rings

Figure 5:
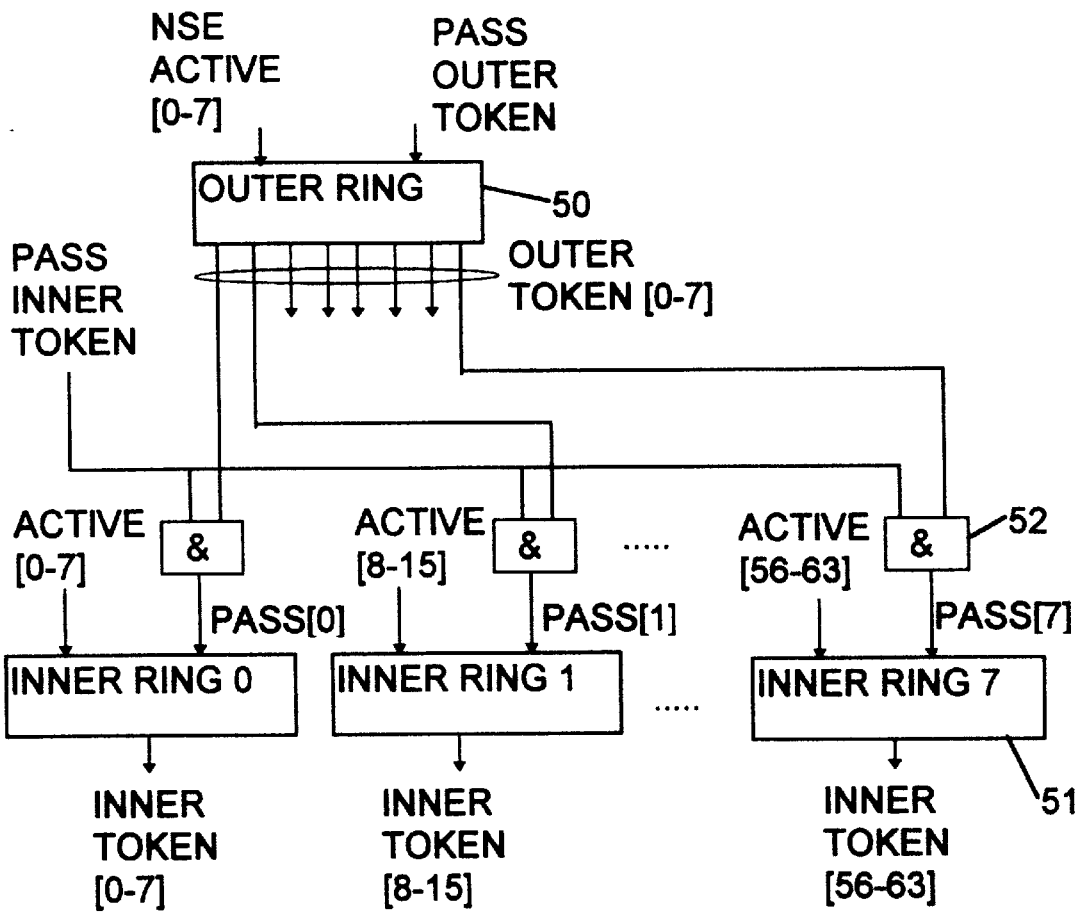
FIG. 5 is a block diagram showing a set of token rings forming part of the arbiter unit.

FIG. 5 shows the token rings 27 in more detail. The token rings include an outer ring 50, and eight inner rings 51. (For clarity, only three of the inner rings are shown in the drawing).

The outer ring receives PASS_OUTER_TOKEN and NSE_ACTIVE[0–7], and produces OUTER_TOKEN [0–7]. PASS_OUTER_TOKEN causes the outer token to be passed around the outer ring.

The inner rings receive PASS[0–7] and ACTIVE[0–63] as shown. The PASS[0–7] signals are produced by eight AND gates 52, which receive PASS_INNER_TOKEN and OUTER_TOKEN[0–7] as shown. The PASS[0–7] signals cause the inner tokens to be passed around the inner rings.

Outer Ring

Figure 6:
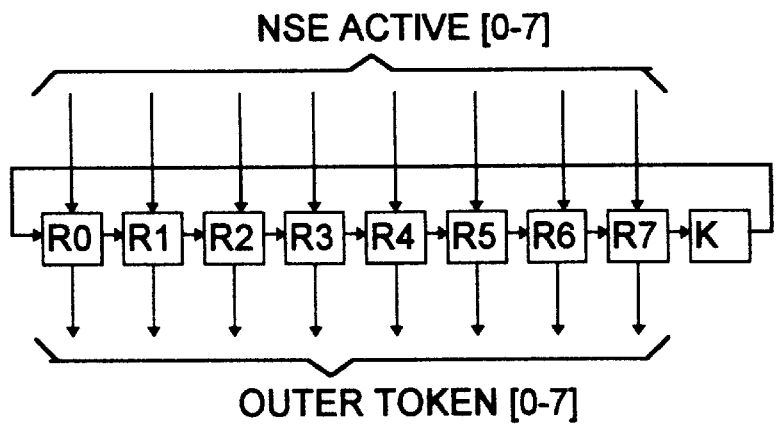
FIG. 6 is a block diagram showing one of the token rings in more detail.

FIG. 6 shows the outer ring in more detail.

The outer ring includes eight single-bit token registers R0–R7, connected in series as shown, along with a further single-bit register K, referred to as the keeper register. The output of the keeper register K is connected back to the input of the R0, to form a closed ring. Normally, one of the registers R0–R7, K contains a "1" (the token) while the other registers all contain "0". The registers R0–R7 respectively receive the NSE_ACTIVE[0–7] signals. The outputs of the registers R0–R7 provide the signals OUTER_TOKEN [0–7].

Figure 7:
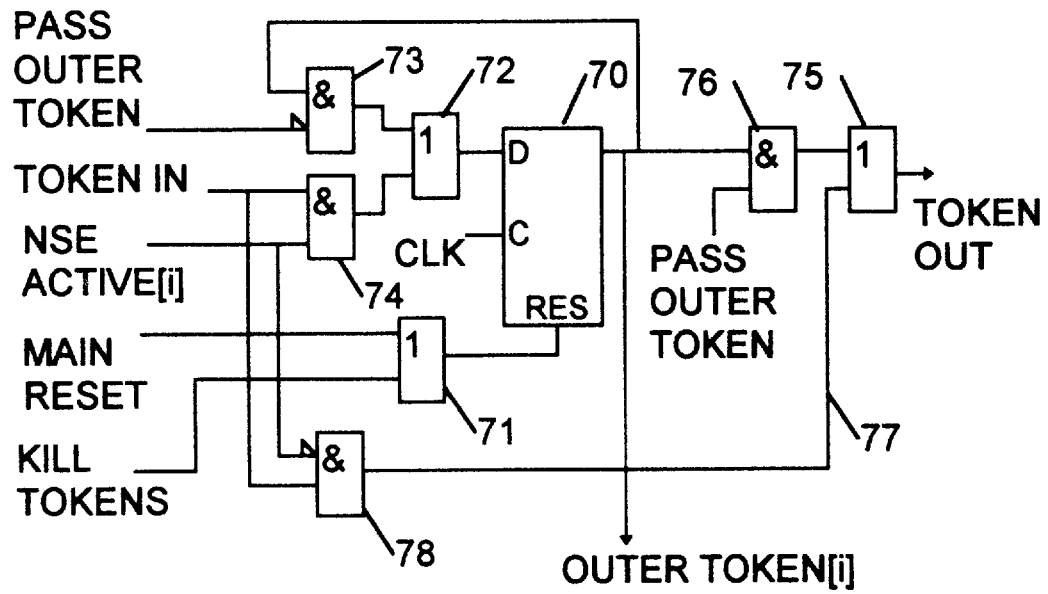
FIG. 7 is a logic circuit diagram showing a token register forming part of one of the token rings.

FIG. 7 shows the ith token register Ri in the outer ring. The register comprises a flip-flop 70, the data output of which provides the OUTER_TOKEN[i] signal for this register. The flip-flop is clocked by a system clock signal CLK. It is reset by the output of an OR gate 71 which receives the MAIN_RESET signal and a KILL_TOKENS signal.

The data input of the flip-flop receives the output of an OR gate 72, which in turn receives the outputs of two AND gates 73,74. AND gate 73 receives the output of the flip-flop, and the inverse of the PASS_OUTER_TOKEN signal. AND gate 74 receives signals TOKEN_IN and NSE_ACTIVE [i]. TOKEN_IN is connected to receive a TOKEN_OUT signal from the preceding register in the ring or, in the case of R0, from the keeper register K.

The TOKEN_OUT signal is produced by an OR gate 75 which receives the output of an AND gate 76, and the signal from a bypass path 77. The AND gate 76 receives the output of the flip-flop, and the PASS_OUTER_TOKEN signal. The bypass path 77 is connected to the output of an AND gate 78, one input of which receives the inverse of the NSE_ACTIVE[i] signal, and the other input of which receives the TOKEN_IN signal.

Figure 8:
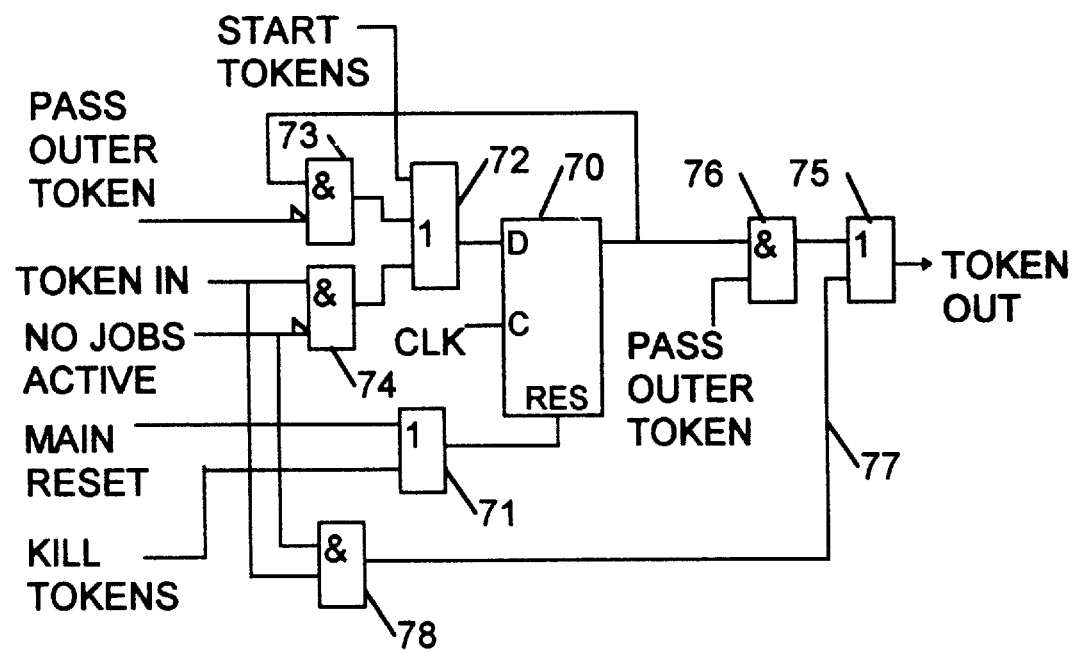
FIG. 8 is a logic circuit diagram showing a keeper register forming part of one of the token rings.

FIG. 8 shows the keeper register K in the outer ring. The keeper register K is similar to the token register shown in FIG. 7, and corresponding components have therefore been given the same reference numerals. The keeper register differs from the token register as follows:

(a) In the keeper register, the AND gate 74 receives the inverse of NO_JOBS_ACTIVE instead of NSE_ACTIVE[i].

(b) In the keeper register, the AND gate 78 receives NO_JOBS_ACTIVE instead of the inverse of NSE_ACTIVE[i].

(c) In the keeper register, the OR gate 72 receives a further input signal START_TOKENS.

The operation of the outer ring is as follows. Initially, it is assumed that the outer ring contains no token; that is, the token registers R and keeper register K all contain "0". Operation of the outer ring is started by the START_TOKENS signal, which causes a "1" (representing a token) to be injected into the keeper register.

Each time PASS_OUTER_TOKEN goes true, the token is passed one step forward to the next register in the ring, via the AND gate 77, OR gate 75, AND gate 74, and OR gate 72. However, if any of the NSE_ACTIVE[0–7] signals is false, the AND gate 74 in the corresponding token register is disabled, and the AND gate 78 is enabled, so that the token will be diverted down the bypass path 77, bypassing the flip-flop 70. In other words, the token will circulate only through those token registers for which the corresponding NSE_ACTIVE[0–7] signal is true.

If any of the NSE_ACTIVE[0–7] signals is true, NO_JOBS_ACTIVE is false, and this causes the keeper register K to be bypassed. The bypass on the keeper register is removed only when NO_JOBS_ACTIVE is true. Thus, the keeper register preserves the token when all of the token registers R0–R7 are bypassed, but is otherwise inactive.

Inner Rings

Each of the inner rings is similar to the outer ring as described above with reference to FIGS. 6–8, except for the following differences:

(a) Instead of the NSE_ACTIVE[0–7] signals, each inner ring receives eight of the ACTIVE[0–63] signals, as indicated in FIG. 5.

(b) Instead of the PASS_OUTER_TOKEN signal, each inner ring receives the corresponding PASS[0–7] signal from one of the AND gates 52, as indicated in FIG. 5.

(c) The outputs of the token registers in the inner rings provide the signals INNER_TOKEN[0–63].

(d) In the keeper register of each inner ring, AND gate 74 receives the corresponding NSE_ACTIVE[0–7] signal, instead of the inverted NO_JOBS_ACTIVE signal.

(e) In the keeper register of each inner ring AND gate 78 receives the inverse of the corresponding NSE_ACTIVE[0–7] signal, instead of the NO_JOBS_ACTIVE signal.

The operation of the inner rings is similar to that of the outer ring. Operation is started by the START_TOKENS signal, which injects a token into the keeper register in each inner ring. Each time the PASS_INNER_TOKEN signal goes true, the AND gate 32 corresponding to the current position of the token in the outer ring will be enabled, which makes the corresponding PASS[0–7] signal true. This causes the token in the corresponding inner ring to be passed one step forward to the next register in the ring. However, if any of the ACTIVE[0–63] signals is false, the token will bypass the corresponding register. In other words, the token will circulate only through those registers for which the corresponding ACTIVE[0–63] signal is true.

The keeper register in each inner ring is bypassed if the corresponding NSE_ACTIVE[0–7] signal is true.

State Machine

Figure 9:
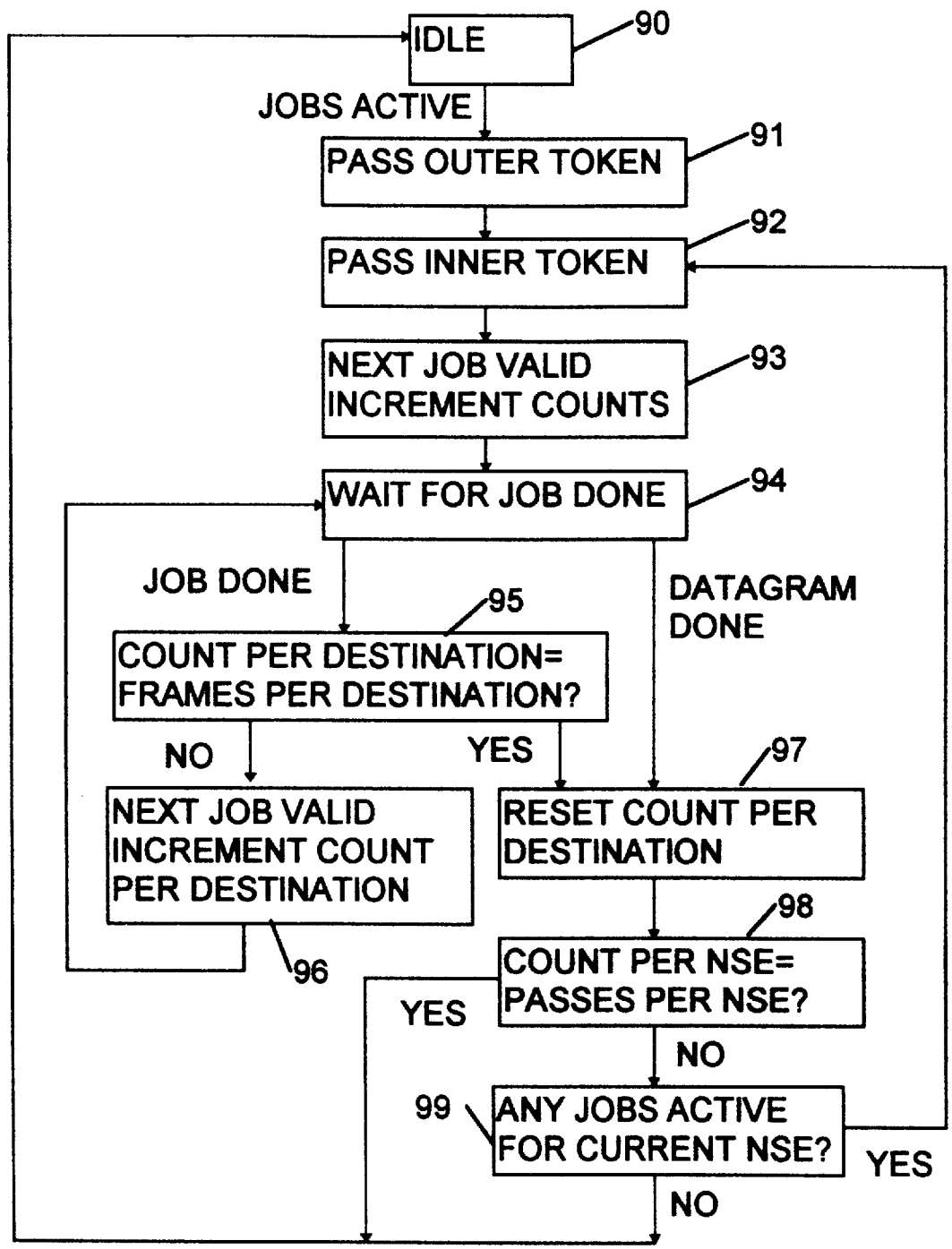
FIG. 9 is a flow chart showing the operation of a state machine forming part of the arbiter unit.

The state machine 24 will now be described in detail with reference to the flow chart of FIG. 9.

(Step 90) Initially, the state machine waits in an idle state, until NO_JOBS_ACTIVE goes false, indicating that there is now at least one job active. In the idle state, the state machine resets two count values, COUNT_PER_DESTINATION and COUNT_PER_NSE, to zero. COUNT_PER_DESTINATION is used to count the number of frames sent to the currently selected destination PE. COUNT_PER_NSE is used to count the number of inner token passes.

(Step 91) When NO_JOBS_ACTIVE goes false, the state machine raises the PASS_OUTER_TOKEN signal for one clock beat. This advances the outer token, as described above. The outer token selects one of the inner rings, and one of the second-level NSEs (NSE8–NSE15).

(Step 92) The state machine then raises the PASS_INNER_TOKEN signal for one clock beat. This advances the token in the selected inner ring, as described above. The inner token selects one of the PEs connected to the selected second-level NSE as the destination for the next job.

(Step 93) The state machine then raises the NEXT_JOB_VALID signal for one clock beat. This triggers the transmission circuits in the PE into sending a frame, to the selected destination PE as indicated by NEXT_JOB_ADDRESS. The two count values COUNT_PER_DESTINATION and COUNT_PER_NSE are both incremented by one.

(Step 94) The state machine then enters a waiting state in which it waits to receive either a JOB_DONE or a DATAGRAM_DONE signal from the transmission circuits in the PE. If a JOB_DONE signal is received, the state machine proceeds to step 95. If a DATAGRAM_DONE signal is received, the state machine proceeds to step 97.

(Step 95) The state machine compares the COUNT_PER_DESTINATION value with the FRAMES_PER_DESTINATION parameter held in register 25. If COUNT_PER_DESTINATION equals FRAMES_PER_DESTINATION, the state machine proceeds to step 97; otherwise, it proceeds to step 96.

(Step 96) The state machine again raises the NEXT_JOB_VALID signal. This again triggers the transmission circuits in the PE into sending the next frame to the same destination PE. The state machine also increments COUNT_PER_DESTINATION by one, and then returns to the waiting state (Step 94).

(Step 97) In this state, the state machine resets COUNT_PER_DESTINATION to zero.

(Step 98) The state machine then compares COUNT_PER_NSE with the PASSES_PER_NSE parameter held in registers 25. If COUNT_PER_NSE equals PASSES_PER_NSE, the state machine returns to step 90; otherwise it proceeds to step 99.

(Step 99) The state machine checks NSE_ACTIVE[0–7] to determine whether any jobs are still active for the currently selected second-level NSE. If there are any active jobs, the state machine returns to step 92 above, to pass the inner token again and thus to select the next active destination PE connected to that NSE as the next job. Otherwise, the state machine returns to step 90 above.

In summary, it can be seen that the state machine will cause a number of frames equal to FRAMES_PER_DESTINATION to be sent to the currently selected destination PE, before raising PASS_INNER_TOKEN. This advances the inner token, so as to select the next PE attached to the same second-level NSE. After the inner token has been passed PASSES_PER_NSE times, PASS_OUTER_TOKEN is raised. This advances the outer token, so as to select another group of eight PEs, attached to a different second-level NSE.

Preferably, the value of PASSES_PER_NSE is chosen to be sufficiently small so that the message traffic is spread over the second-level NSEs, in such a way that the probability of overloading any of the NSEs is reduced. Typically, PASSES_PER_NSE is equal to 4, and FRAMES_PER_DESTINATION is equal to 2.

SOME POSSIBLE MODIFICATIONS

It will be appreciated that many modifications may be made to the system described above without departing from the scope of the present invention.

For example, instead of the two-level token-passing scheme described above, a single-level scheme may be used, or alternatively a greater number of levels may be used.

I claim:

1. Arbitration apparatus for arbitrating between active ones of a plurality of jobs in groups, wherein each of said groups of jobs including a plurality of active and inactive jobs, said arbitration apparatus comprising:

(a) a first token ring comprising a plurality of registers connected in a ring, each of said plurality of registers corresponding to one of said groups of said jobs;

(b) a plurality of further token rings each comprising a plurality of further registers connected in a ring, each of said further registers within said further token rings corresponding to a specific one of said jobs in one of said groups of jobs;

(c) means for passing a token around said first token ring and for selecting one of said further token rings in accordance with the current position of said token within said first token ring; and (d) means for passing a further token around the selected one of said further token rings and for selecting one of said jobs in one of said groups of jobs in accordance with the position of said further token within the selected one of said further token rings.

2. Apparatus according to claim 1, further including an activity register containing a plurality of activity bits indicating which of said jobs are active and which are inactive, wherein (a) said first token ring includes a plurality of selectively operable bypass paths, controlled by said activity bits, for causing said token to bypass any of said registers that correspond to inactive jobs; and (b) each of said further token rings includes a further plurality of selectively operable bypass paths, controlled by said activity bits, for causing said further token to bypass any of said further registers that correspond to inactive jobs.

3. Apparatus according to claim 2 wherein each of said token rings further includes a keeper register, and wherein there is provided a selectively operable keeper register bypass path, controlled by said activity bits, for causing said token to bypass said keeper register unless all jobs associated with that token ring are inactive.

4. Apparatus according to claim 1 including means for storing an adjustable parameter, and means for using said adjustable parameter to limit the maximum number of times said further token is passed in any of said further rings before said token in said first ring is passed.

5. A data processing system comprising a plurality of processing elements interconnected by a network, wherein each of said processing elements includes arbitration apparatus for arbitrating between a plurality of jobs in groups, wherein each of said groups of jobs including a plurality of active and inactive jobs, said arbitration apparatus comprising:

(a) a first token ring comprising a plurality of registers connected in a ring, each of said plurality of registers corresponding to one of said groups of said jobs;

(b) a plurality of further token rings each comprising a plurality of further registers connected in a ring, each of said further registers within said further token rings corresponding to a specific one of said jobs in one of said groups of jobs;

(c) means for passing a token around said first token ring and for selecting one of said further token rings in accordance with the current position of said token within said first token ring; and (d) means for passing a further token around the selected one of said further token rings and for selecting one of said jobs in one of said groups of jobs in accordance with the position of said further token within the selected one of said farther token rings.

6. A data processing system according to claim 5, further including an activity register containing a plurality of activity bits indicating which of said jobs are active and which are inactive, wherein (a) said first token ring includes a plurality of selectively operable bypass paths, controlled by said activity bits, for causing said token to bypass any of said registers that correspond to inactive jobs; and (b) each of said further token rings includes a further plurality of selectively operable bypass paths, controlled by said activity bits, for causing said further token to bypass any of said further registers that correspond to inactive jobs.

7. A data processing system according to claim 6 wherein each of said token rings further includes a keeper register, and wherein there is provided a selectively operable keeper register bypass path, controlled by said activity bits, for causing said token to bypass said keeper register unless all jobs associated with that token ring are inactive.

8. A data processing system according to claim 5 including means for storing an adjustable parameter, and means for using said adjustable parameter to limit the maximum number of times said further token is passed in any of said further rings before said token in said first ring is passed.

* * * * *